United States Patent
Mirfakhraei

(10) Patent No.: US 10,042,483 B2
(45) Date of Patent: Aug. 7, 2018

(54) TOUCH SYSTEM WITH CODE HOPPING ALGORITHMS AND CODE DIVISION MULTIPLEXING

(71) Applicant: Khashayar Mirfakhraei, Los Altos, CA (US)

(72) Inventor: Khashayar Mirfakhraei, Los Altos, CA (US)

(73) Assignee: Atmel Corporation, Chandler, AZ (US)

( * ) Notice: Subject to any disclaimer, the term of this patent is extended or adjusted under 35 U.S.C. 154(b) by 0 days.

(21) Appl. No.: 14/256,176

(22) Filed: Apr. 18, 2014

(65) Prior Publication Data

US 2015/0301631 A1    Oct. 22, 2015

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 7,663,607 B2 | 2/2010 | Hotelling |
| 7,864,503 B2 | 1/2011 | Chang |
| 7,875,814 B2 | 1/2011 | Chen |
| 7,920,129 B2 | 4/2011 | Hotelling |
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,179,381 B2 | 5/2012 | Frey |
| 8,217,902 B2 | 7/2012 | Chang |
| 2007/0109274 A1* | 5/2007 | Reynolds ............... G06F 3/041 345/173 |
| 2008/0309635 A1 | 12/2008 | Matsuo |
| 2009/0315854 A1 | 12/2009 | Matsuo |

(Continued)

FOREIGN PATENT DOCUMENTS

WO    WO 2012/129247 A2    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

*Primary Examiner* — Ryan A Lubit
(74) *Attorney, Agent, or Firm* — Baker Botts L.L.P.

(57) ABSTRACT

In one embodiment, a system includes a touch sensor and a computer-readable storage media coupled to the touch sensor and embodying logic that is configured when executed to receive a first plurality of sense signals from sense electrodes of the touch sensor and determine, based on characteristics of the first plurality of sense signals, a plurality of codes. The logic may then assign the plurality of codes to each of the drive electrodes of the touch sensor and determine, based on the assignment of the first plurality of codes to the drive electrodes, encoded drive signals which may be applied to the drive electrodes. The logic may then receive, based on the encoded drive signals, a second plurality of sense signals from the sense electrodes and determine, based on the assignment of the first plurality of codes to drive electrodes, a first touch on the touch sensor.

21 Claims, 5 Drawing Sheets

(56) References Cited

U.S. PATENT DOCUMENTS

| | | | |
|---|---|---|---|
| 2011/0042152 A1* | 2/2011 | Wu | G06F 3/0416 |
| | | | 178/18.03 |
| 2012/0013565 A1* | 1/2012 | Westhues | G06F 3/0418 |
| | | | 345/174 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0076612 A1 | 3/2013 | Myers | |
| 2014/0049507 A1* | 2/2014 | Shepelev | G06F 3/0412 |
| | | | 345/174 |
| 2015/0054754 A1* | 2/2015 | Han | G06F 3/0418 |
| | | | 345/173 |

* cited by examiner

TOUCH SYSTEM WITH CODE HOPPING ALGORITHMS AND CODE DIVISION MULTIPLEXING

TECHNICAL FIELD

This disclosure generally relates to touch sensors, and more particularly to sensor designs incorporating code hopping algorithms with code divisions multiplexing.

BACKGROUND

Current touch sensor systems may using time division multiplexing (TDM) schemes on the drive lines require scanning of the drive line and sense line pairs ("drive-sense pairs") separately at differing times. These schemes may thus limit the amount of sensing time that may be devoted to each drive-sense pair on the touch sensor. In addition, touch sensor designs using TDM may not adequately address noise signals that may appear on the sense lines due to environmental or other types of interference. This may lead to low signal to noise ratios (SNR) of the sensed signals.

DESCRIPTION OF EXAMPLE EMBODIMENTS

Figure 1:
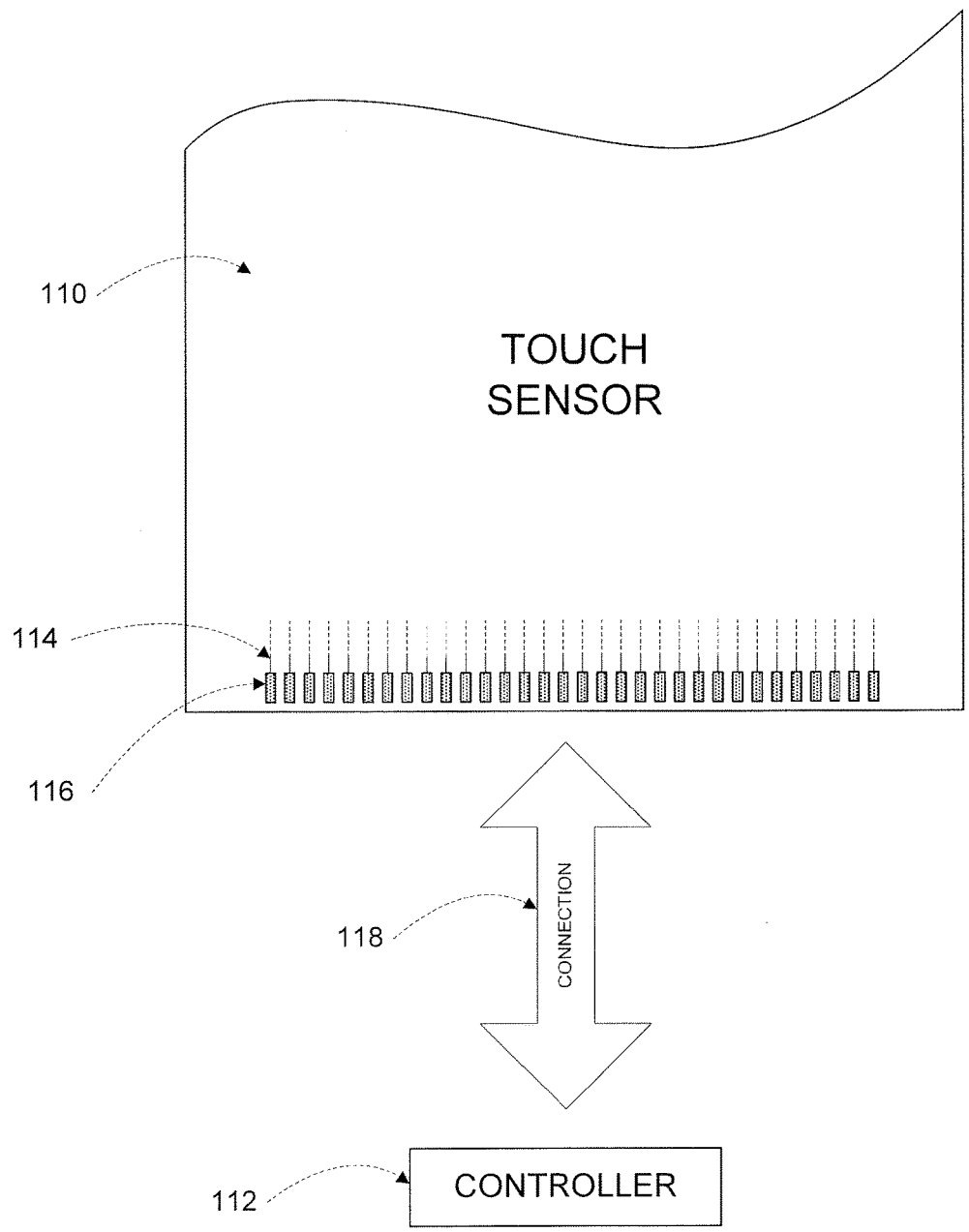
FIG. 1 illustrates an example touch sensor with an example touch-sensor controller according to particular embodiments of the present disclosure.

FIG. 1 illustrates an example hybrid capacitive touch sensor 110 with an example touch-sensor controller 112 according to particular embodiments of the present disclosure. Touch sensor 110 and touch-sensor controller 112 may detect the presence and location of a touch or the proximity of an object within a touch-sensitive area of touch sensor 110. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 110 may include one or more touch-sensitive areas, where appropriate. Touch sensor 110 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 110. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 110 and touch-sensor controller 112. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display. As another example, the mechanical stack may include the layers shown in FIGS. 2A-2B and described further below.

One or more portions of the substrate of touch sensor 110 may be made of polyethylene terephthalate (PET), glass, or another suitable material. This disclosure contemplates any suitable substrate with any suitable portions made of any suitable material. In particular embodiments, the drive or sense electrodes in touch sensor 110 may be made of ITO in whole or in part. In particular embodiments, the drive or sense electrodes in touch sensor 110 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 110 may implement a hybrid capacitive form of touch sensing, which may include both mutual- and self-capacitance sensing modes of operation in a capacitive sensor. In a mutual-capacitance implementations or modes of operation, touch sensor 110 may include an array of drive and sense electrodes forming an array of capacitive nodes. An overlapping area of a drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 112) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 112 may measure the change in capacitance. By measuring changes in capacitance throughout the array, touch-sensor controller 112 may determine the position of the touch or proximity within the touch-sensitive area(s) of touch sensor 110.

In a self-capacitance implementations or modes of operation, touch sensor 110 may include an array of electrodes of a single type that may each form a capacitive node. In some embodiments, touch sensor 110 may include an array of driven and grounded electrodes, with each area overlap between the driven and grounded electrode forming a capacitive node. When an object touches or comes within proximity of the capacitive node, a change in self-capacitance may occur at the capacitive node and touch-sensor controller 112 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 112 may determine the position of the touch or proximity within the touch-sensitive area(s) of touch sensor 110. This disclosure contemplates any suitable form of capacitive touch sensing, where appropriate.

In particular embodiments, one or more drive electrodes may together form a drive line miming horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 110 may indicate a touch or proximity input at the position of the capacitive node. Touch-sensor controller 112 may detect and process the change in capacitance to determine the presence and location of the touch or proximity input. Touch-sensor controller 112 may then communicate information about the touch or proximity input to one or more other components (such one or more central processing units (CPUs)) of a device that includes touch sensor 110 and touch-sensor controller 112, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 112 may be one or more integrated circuits (ICs), such as for example general-purpose microprocessors, microcontrollers, programmable logic devices or arrays, application-specific ICs (ASICs). In particular embodiments, touch-sensor controller may include a computer system such as computer system 500 described with respect to FIG. 5. In particular embodiments, touch-sensor controller 112 comprises analog circuitry, digital logic, and digital non-volatile memory. In particular embodiments, touch-sensor controller 112 is disposed on a flexible printed circuit (FPC) bonded to the substrate of touch sensor 110, as described below. The FPC may be active or passive, where appropriate. In particular embodiments, multiple touch-sensor controllers 112 are disposed on the FPC. Touch-sensor controller 112 may include a processor unit, a drive unit, a sense unit, and a storage unit. The drive unit may supply drive signals to the drive electrodes of touch sensor 110. The sense unit may sense charge at the capacitive nodes of touch sensor 110 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 110. The processor unit may also track changes in the position of a touch or proximity input within the touch-sensitive area(s) of touch sensor 110. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 114 of conductive material disposed on the substrate of touch sensor 110 may couple the drive or sense electrodes of touch sensor 110 to connection pads 116, also disposed on the substrate of touch sensor 110. As described below, connection pads 116 facilitate coupling of tracks 114 to touch-sensor controller 112. Tracks 114 may extend into or around (e.g. at the edges of) the touch-sensitive area(s) of touch sensor 110. Particular tracks 114 may provide drive connections for coupling touch-sensor controller 112 to drive electrodes of touch sensor 110, through which the drive unit of touch-sensor controller 112 may supply drive signals to the drive electrodes. Other tracks 114 may provide sense connections for coupling touch-sensor controller 112 to sense electrodes of touch sensor 110, through which the sense unit of touch-sensor controller 112 may sense charge at the capacitive nodes of touch sensor 110. Tracks 114 may be made of fine lines of metal or other conductive material. As an example and not by way of limitation, the conductive material of tracks 114 may be copper or copper-based and have a width of approximately 100 μm or less. As another example, the conductive material of tracks 114 may be silver or silver-based and have a width of approximately 100 μm or less. In particular embodiments, tracks 114 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 114, touch sensor 110 may include one or more ground lines terminating at a ground connector (which may be a connection pad 116) at an edge of the substrate of touch sensor 110 (similar to tracks 114).

Connection pads 116 may be located along one or more edges of the substrate, outside the touch-sensitive area(s) of touch sensor 110. As described above, touch-sensor controller 112 may be on an FPC. Connection pads 116 may be made of the same material as tracks 114 and may be bonded to the FPC using an anisotropic conductive film (ACF). Connection 118 may include conductive lines on the FPC coupling touch-sensor controller 112 to connection pads 116, in turn coupling touch-sensor controller 112 to tracks 114 and to the drive or sense electrodes of touch sensor 110. In another embodiment, connection pads 116 may be connected to an electro-mechanical connector (such as a zero insertion force wire-to-board connector); in this embodiment, connection 118 may not need to include an FPC. This disclosure contemplates any suitable connection 118 between touch-sensor controller 112 and touch sensor 110.

Figure 2A:
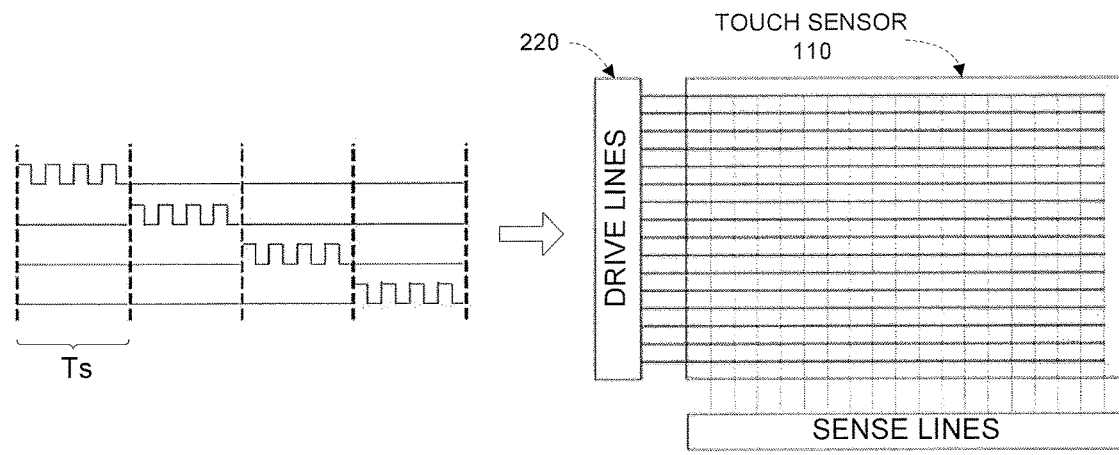
FIG. 2A illustrates an example touch sensor incorporating time division multiplexing (TDM) according to particular embodiments of the present disclosure.
Figure 2B:
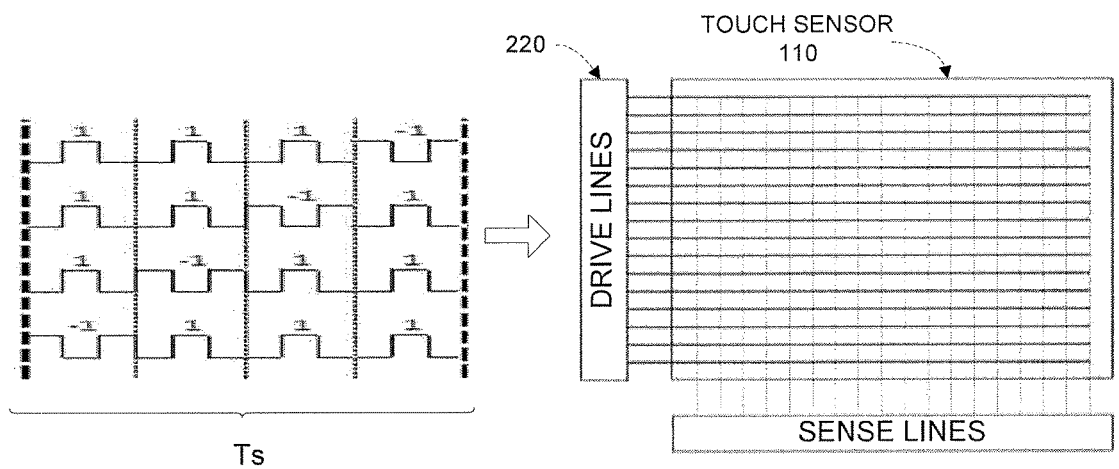
FIG. 2B illustrates an example touch sensor incorporating code division multiplexing (CDM) according to particular embodiments of the present disclosure.

FIG. 2A illustrates an example touch sensor 110 incorporating time division multiplexing (TDM), while FIG. 2B illustrates an example touch sensor 110 incorporating code division multiplexing (CDM) according to particular embodiments of the present disclosure. Current touch sensor systems may using time division multiplexing (TDM) schemes on the drive lines require scanning of the drive line and sense line pairs ("drive-sense pairs") separately at differing times. These schemes may thus limit the amount of sensing time that may be devoted to each drive-sense pair on the touch sensor. In addition, touch sensor designs using TDM may not adequately address noise signals that may appear on the sense lines due to environmental or other types of interference. This may lead to low signal to noise ratios (SNR) of the sensed signals.

Accordingly, embodiments of the present disclosure may incorporate code hopping algorithms along with CDM to enhance SNR on sensed signals and to allow for additional sensing time for each drive line and sense line pair. The sensing time allowed for a drive line and sense line pair in each embodiment may be indicated by $T_S$. As shown by FIGS. 2A and 2B, the sensing time in the embodiment incorporating CDM may be much longer than that of a conventional touch sensor system. This is because CDM systems may allow for multi-line transmissions to temporally coexist while being fully discernable at the receiver. In other words, the codes assigned to the drive signals in CDM systems distinguish those particular drive signals from the other drive signals on the touch sensor, whereas TDM systems require the drive signals to be sent during separate time windows so that they may be distinguished from one another.

In particular embodiments, each drive line may have a unique code assigned to it. The code may be in any suitable form for use with CDM. One example may include square waveforms with alternating positive and negative signals. For instance, referring to FIG. 2B, the first drive line is assigned the code (1, 1, 1, −1), the second drive line is assigned the code (1, 1, −1, 1), the third drive line is assigned the code (1, −1, 1, 1), and the fourth drive line is assigned the code (−1, 1, 1, 1). However, other embodiments may use groups of codes assigned to groups of drive lines. As an example, referring again to FIG. 2B, the first code (1, 1, 1, −1) may be assigned to a first quadrant of drive lines 220 of touch sensor 110, the second code (1, 1, −1, 1) may be assigned to a second quadrant of drive lines 220 of touch sensor 110, the third code (1, −1, 1, 1) may be assigned to a third quadrant of drive lines 220 of touch sensor 110, and the fourth code (−1, 1, 1, 1) may be assigned to a fourth quadrant of drive lines 220 of touch sensor 110. In particular embodiments, the codes assigned may be orthogonal to each of the other codes assigned. Multiplexing the drive signals and the code signals may be performed through any suitable means, such as by using an XOR (exclusive OR) function as shown in FIG. 2B.

In addition to increasing the available sensing time for each drive-sense pair, using CDM may allow for increased SNR on the sensed signals of a touch sensor. This is because using CDM causes the noise power signal that is part of the multiplexed signal to be spread after de-multiplexing on the sense side, which assists in mitigating in-band interference caused by the noise signal. In other words, CDM distributes the multiplexed drive and code signal over many frequencies, and thus avoids in-band interference between each of the drive-sense pairs.

While using CDM in touch sensor systems may reduce SNR on sense line signals, the further incorporation of code hopping algorithms may allow for additionally optimized noise cancelling in the touch sensor system and thus better SNR on the sense line signals. For example, in particular embodiments, the touch sensor system may sense a noise signal on a sense line. This may be done, for instance, when there is no drive signal being applied to the sense line's associated drive line. It may also be done by sensing a dedicated sense line 210 of touch sensor 110 that is not associated with any drive line 220 with a drive signal being applied to it (but may have an assigned code applied to it). The sensed noise signal may be narrow-band and random in its spectral characteristic, which may allow for the use of predictive noise cancelling. Because the spectral shape of the multiplexed drive and code signal may be dictated by the code used for multiplexing, predictive noise cancelling may be performed through careful selection of the code used in the multiplexed signal. Accordingly, based on the noise signal sensed by the touch sensor system using CDM and the noise signal's associated frequency domain signal, the touch sensor system may select an appropriate code to use for multiplexing with the drive signal that will optimize the SNR on the sensed signal. The selection of codes, in particular embodiments, may occur periodically in the system, such as every few milliseconds. This periodic selection of codes may be referred to as code hopping, and this code hopping may allow for optimal SNR ratios on the sense line signals of the touch sensor system over extended periods of time (since the noise signals interfering with the touch sensor may change over time).

In particular embodiments, code rotation may be used along with code hopping. Code rotation may be used with generated or stored, predetermined codes, and may refer to the swapping of the selected codes between the various drive lines in the touch sensor. The rotation of the codes may occur between each noise scan and associated selection of codes (as described above). As an example, after a touch sensor controller has determined that a particular set of codes is optimal for reducing noise in the touch sensor, the determined set of codes may be rotated among the drive lines. As an example, referring to FIG. 2B, the first code indicated may be rotated to the second drive line shown, while the second code indicated may be rotated to the third drive line, the third code indicated may be rotated to the fourth drive line shown, and the fourth code indicated may be rotated back to the first drive line shown. Thus, after this code rotation, the first drive line would be assigned the code (−1, 1, 1, 1), the second drive line would be assigned the code (1, 1, 1, −1), the third drive line would be assigned the code (1, 1, −1, 1), and the fourth drive line would be assigned the code (1, −1, 1, 1). Though the above example indicates rotation among the codes assigned, code rotation may be among more than the codes initially assigned to the drive lines. For instance, if there are N drive lines, a number of codes greater than N may be chosen for rotation between the drive lines. As an example, with sixteen drive lines, twenty four codes may be chosen to rotate between.

Code rotation may be performed, in some embodiments, according to a particular schedule. The code rotation schedule may refer to the period of time after which the codes are rotated among the drive lines and the way in which the codes are rotated among the drive lines (i.e., which codes are rotated to which drive lines). The schedules may be determined based on the noise line scan and the codes chosen. In addition, the schedules may be chosen in order to achieve particular distributions of noise cancellation across the lines of the touch sensor. This is because some of the codes chosen may have different levels of noise cancellation (i.e., some codes may not achieve perfect noise cancellation). For instance, the touch sensor controller may know, based on the selected codes, a particular amount of noise cancellation for each code selected. These amounts of noise cancellation may vary, and based on the variance, the touch sensor controller may determine a code rotation schedule that would achieve certain noise cancellation distributions across the drive lines of the touch sensor. For example, the code rotation schedule may be determined such that noise cancellation is achieved uniformly across a touch screen. As another example, in general touch screen configurations, the touch sensor controller may choose a code rotation schedule that achieves higher noise cancellation toward the center of the touch screen. As yet another example, in touch screens with buttons displayed, the touch sensor controller may determine a code rotation schedule that maximizes the noise cancellation around the displayed buttons on the touch screen.

In particular embodiments, the codes used in code hopping algorithms may be selected from codes already available to the controller based on the noise line scan. The noise line scan may include a scan of the sense lines 210 while no drive signals are being applied to drive lines 220, but where a code is still being applied to the drive lines 220 (i.e., the drive line only contains a code signal). For example, a number of codes may be available to the controller in an associated memory of the touch sensor system. The controller may thus select from the stored codes a set of codes that are spectrally optimal based on the noise line scan. In other embodiments, however, spectrally optimal codes may be generated ad hoc based on the noise line scan. In either embodiment, the controller may assign the selected codes to the drive and sense lines for use in multiplexing and de-multiplexing (as explained further below with respect to FIGS. 3 and 4).

In addition to the above benefits, using CDM in touch sensor systems may decrease processing power and/or time required by the controller of the touch sensor system, and may therefore allow for lower hardware costs.

Although illustrated as square waveforms in FIGS. 2A and 2B, CDM may be used with any suitable drive signal waveform, such as a sinusoidal waveform. In addition, although the signals are illustrated in FIG. 2B as unipolar signals (i.e., the voltage transitions occur between two voltage levels, such as between 0 and 1), the signals may be bipolar signals (i.e., the voltage transitions occur between three voltage levels, such as between 1, 0, and −1). Moreover, although the signaling illustrated in FIG. 2B is double edged (i.e., a "1" signal comprises both an upward and a corresponding downward voltage transition, while a "−1" signal comprises both a downward and a corresponding upward voltage transition), any suitable edge signaling may be used such as single edge signaling (i.e., a "1" signal comprises just an upward voltage transition, while a "−1" signal comprises just a downward voltage transition). Additional details of an example touch sensor system incorporating code hopping algorithms along with CDM are discussed below with respect to FIGS. 3 and 4.

Figure 3:
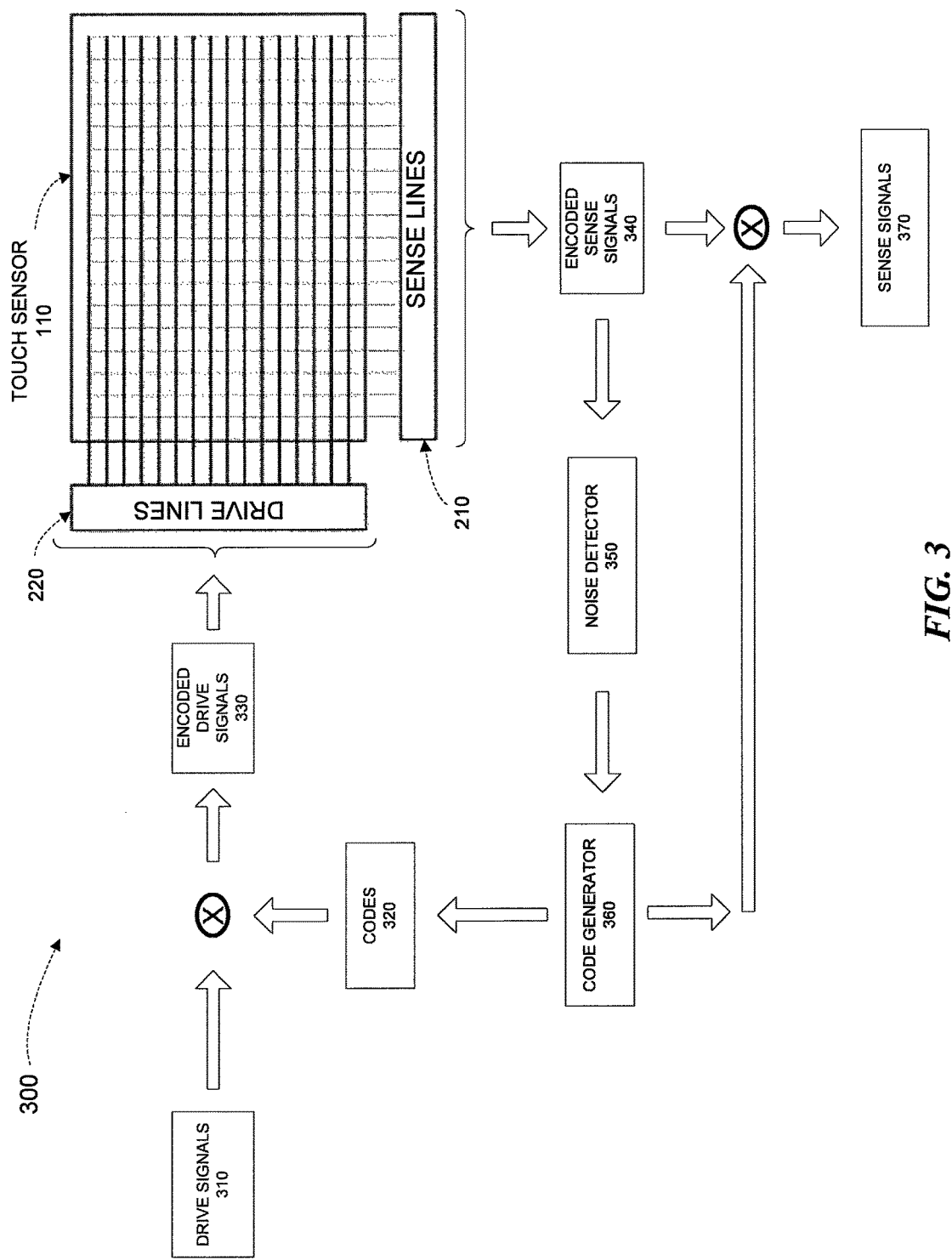
FIG. 3 illustrates an example touch sensor system incorporating code hopping algorithms with CDM according to particular embodiments of the present disclosure.

FIG. 3 illustrates an example touch sensor system 300 incorporating code hopping algorithms with CDM according to particular embodiments of the present disclosure. In touch sensor system 300, drive signals 310 (such as drive signal 201 of FIG. 2B) may be multiplexed with a set of codes 320 (such as code signal 202) provided by code generator 360 to yield an encoded array of drive signals 330. The encoded drive signals 330 may be input to the drive lines 220 of touch sensor 110. These encoded drive signals 330 may, however, encounter noise interference which may be further multiplexed into each of the encoded drive signals 330. The sense lines 210 may then sense signals 340 associated with the drive signals 330. The sense signals 340 may be encoded with the codes 320 applied to the drive signals 310. To yield the underlying sense signals 370 associated with the drive signals 310, the encoded sense signals 340 may be de-multiplexed using the codes 320 provided by code generator 360.

In particular embodiments, codes 320 may be sent to drive lines 220 with no associated drive signal 310 (i.e., the multiplexing yields the codes themselves and the encoded drive signals 330 become codes 320) in order to sense the interference noise signal incident upon the touch sensor 110. The encoded sense signals 340 received at sense lines 210 may thus be the interference noise signal multiplexed with the codes 320. These encoded sense signals 340 may then be sent to noise detector 350, which may determine a spectral characteristic or frequency domain signal of the encoded noise. Using the determined frequency domain signal of the encoded noise, code generator 360 may determine an appropriate set of codes 320 that will enhance the noise cancellation in the touch sensor 110 and thus optimize SNR ratios on the de-coded sense signals 370.

In particular embodiments, the codes 320 generated by code generator 360 may be selected from codes already available to the controller. For instance, a number of codes may be available to the controller in an associated memory of the touch sensor system. Code generator 360 may thus select from the stored codes a set of codes 320 that are spectrally optimal based on the sensed signals without a drive signal applied as described above. In other embodiments, code generator may generate spectrally optimal codes ad hoc based on the sensed signals without a drive signal applied as described above.

Once code generator 360 has selected appropriate codes 320 to optimize noise cancelling, the codes 320 may then be multiplexed with drive signals 310, yielding encoded drive signals 330 which are sent to drive lines 220. Sense lines 210 then receive encoded sense signals 340. Encoded sense signals 340 may then be de-multiplexed using the determined codes 320 to yield de-coded sense signals 370, which may then be used by the controller of the touch sensor (e.g., controller 112 of FIG. 1) to determine whether a touch has occurred on the touch sensor.

Figure 4:
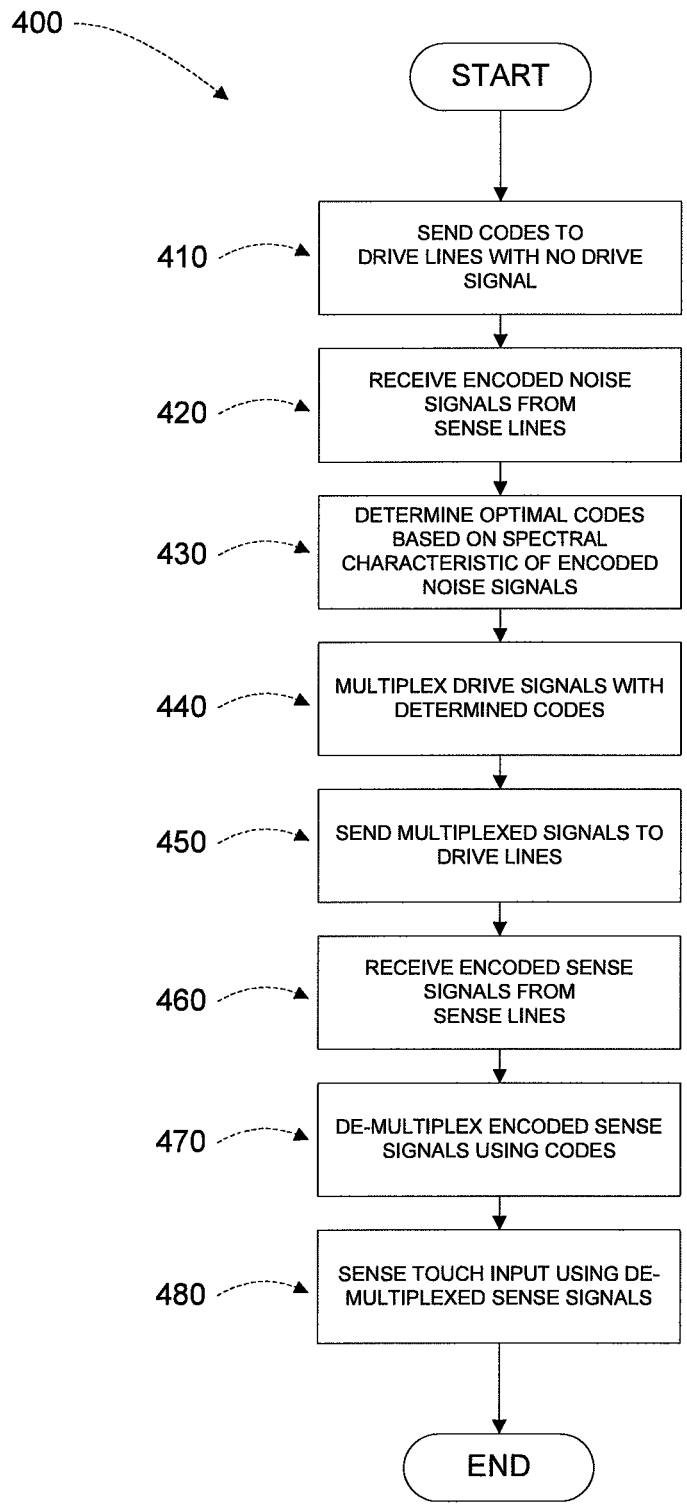
FIG. 4 illustrates an example method for incorporating code hopping algorithms with CDM according to particular embodiment of the present disclosure.

FIG. 4 illustrates an example method 400 for incorporating code hopping algorithms with CDM according to particular embodiment of the present disclosure. The method begins at step 410, where codes (such as codes 320 of FIG. 3) are sent to drive lines of a touch sensor (e.g., drive lines 220 of touch sensor 110 in FIG. 3). In particular embodiments, the codes may be first multiplexed with a zero magnitude drive signal prior to sending to the drive lines of the touch sensor (e.g., multiplexing the codes with a zero magnitude drive signal using an XOR function to yield the codes themselves). This step may have the effect of multiplexing the codes with the noise signal alone, causing the sensed signals on the touch sensor to be encoded noise signals. The encoded noise signals are then received at the sense lines of the touch sensor at step 420.

At step 430, the encoded noise signal is analyzed to determine a spectral characteristic (i.e., the associated frequency domain signal of the encoded noise signal), and optimal codes for noise cancelling on the touch sensor are determined base on that spectral characteristic. Determining the spectral characteristic may be performed in any suitable manner, such as through Fourier or Laplace transform analysis. Determining the codes for use in the touch sensor system may include assigning particular codes to drive signals to be input to the drive lines of the touch sensor. In some embodiments, determining which codes to use in the touch sensor system may include determining which of a predetermined set of codes stored in memory is the most efficient at cancelling the noise incident upon the touch sensor. In other embodiments, determining which codes to use may include generating codes ad hoc that are most optimal for cancelling noise incident upon the touch sensor. As an example, generating the codes may be done using a sequence generator seeded with a random initial value. The determined codes may be orthogonal to one another in certain embodiments. In some embodiments each drive signal may have a unique code assigned to it (i.e., one to one code mapping), while other embodiments may each code to a different group of drive lines (i.e., one to many code mapping).

The determined codes are then multiplexed at step 440 with the associated drive signals (such as drive signals 310 of FIG. 3). The multiplexing of codes and drive signals may be performed using any suitable technique. For example, the codes and drive signals may be multiplexed using an exclusive OR (XOR) function. The multiplexed signals are then sent to the drive lines of the touch sensor (e.g., drive lines 220 of touch sensor 110 of FIG. 3) at step 450. Encoded sense signals are received at the sense lines of the touch sensor (e.g., sense lines 210 of touch sensor 110 or FIG. 3) at step 460, and then de-multiplexed using the determined codes at step 470. The resulting de-coded sense signals are then analyzed by the touch sensor controller at 480 to determine whether a touch input has occurred on the touch sensor.

In particular embodiments, steps 440-480 may repeat using the codes determined at step 430 any suitable number of times. The method may then end or may restart at step 410. In certain embodiments, the number of times that steps 440-480 repeat may be dictated based on a predetermined time period for sensing the noise incident upon the touch sensor. For example, a touch sensor may determine the optimal codes for use in sensing touch at steps 410-430, then use those codes to sense touch on the touch sensor according to steps 440-480 for a predetermined sensing time period. The predetermined sensing time period may be any suitable time period, such as 1 ms, 5 ms, 10 ms, or 50 ms. During this predetermined sensing time period, steps 440-480 may repeat any number of times. When the predetermined sensing time period is up, the touch sensor may re-sense the noise incident upon the touch sensor according to steps 410-430 of method 400, and then repeat steps 440-480 of method 400 to continue sensing touch on the touch sensor. This process may be repeated for the entire time the touch sensor is in operation, and may be controlled by the touch sensor controller (e.g., controller 112 of FIG. 1).

In addition, code rotation as described above may be utilized in method 400 in any suitable manner. For instance, after step 430, the touch sensor controller may determine an amount of noise cancellation associated with each of the determined optimal codes. Based on the determined amount of noise cancellation associated with each of the codes, the touch sensor controller may then determine a code rotation schedule. The code rotation schedule may include both a time schedule for the rotation of codes (i.e., the amount of time after which the codes with rotate) and a mapping of the drive lines to which the codes will rotate (i.e., which drive lines each of the codes are rotated to). This code rotation schedule may be determined based on any suitable factors, such as a desired noise cancellation distribution across a touch screen associated with the touch sensor.

Figure 5:
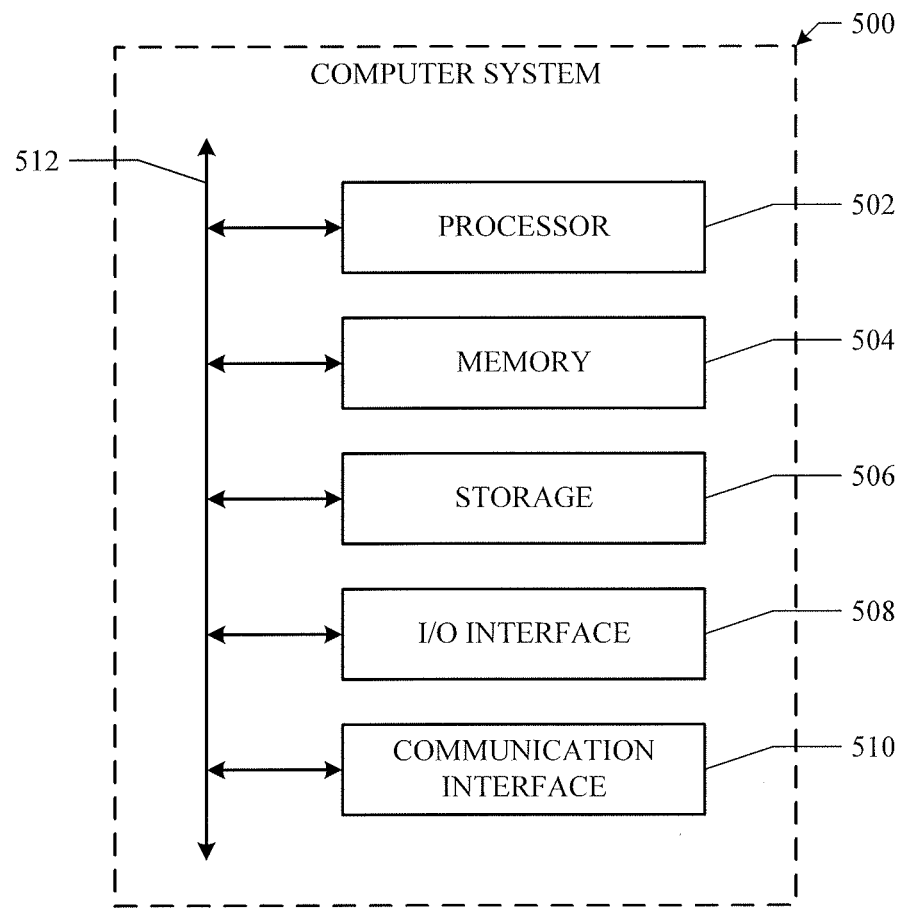
FIG. 5 illustrates an example computer system for use with the touch sensor of FIGS. 1-4 according to particular embodiments of the present disclosure.

FIG. 5 illustrates an example computer system 500 for use with the touch sensor of FIGS. 1-4 according to particular embodiments of the present disclosure. For example, controller 112 of FIG. 1 may include one or more computer systems 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. In particular embodiments, the software running on one or more computer systems 500 may be logic encoded on a computer readable medium. Particular embodiments include one or more portions of one or more computer systems 500. Herein, reference to a computer system may encompass a computing device, and vice versa, where appropriate. Moreover, reference to a computer system may encompass one or more computer systems, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory in some embodiments. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes computer-readable non-transitory storage medium or media for storing data or instructions. Storage 506 may include removable or non-removable (or fixed) computer-readable media, where appropriate. Storage 506 may be internal or external to computer system 500, where appropriate. In particular embodiments, storage 506 is non-volatile, solid-state memory. In particular embodiments, storage 506 includes read-only memory (ROM). Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a touch sensor such as touch sensor 110 of FIG. 1. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. One or more portions of one or more of these networks may be wired or wireless. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. Bus 512 may include one or more buses 512, where appropriate. Although this disclosure describes and illustrates a particular bus, this disclosure contemplates any suitable bus or interconnect.

Herein, reference to a computer-readable non-transitory storage medium or media may include one or more semiconductor-based or other integrated circuits (ICs) (such as, for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system, comprising:
a touch sensor; and
one or more computer-readable non-transitory storage media coupled to the touch sensor and embodying logic that is configured when executed to:
apply encoded signals to one or more lines of a plurality of drive lines of the touch sensor, the encoded signals comprising respective particular codes multiplexed with a zero magnitude drive signal using a first logical operation such that applying the encoded signals comprises applying the respective particular codes to the one or more lines while the drive signal is not applied to the one or more lines;
receive, based on the encoded signals, a first plurality of sense signals from a plurality of sense lines of the touch sensor, the first plurality of sense signals comprising encoded noise signals;
determine, based on characteristics of the first plurality of sense signals, a first plurality of codes;
assign a code of the first plurality of codes to each of the plurality of drive lines of the touch sensor, at least two of the plurality of drive lines being assigned different codes;
determine, based on the assignment of the first plurality of codes to drive lines, a first plurality of encoded drive signals;
apply the first plurality of encoded drive signals to the plurality of drive lines, at least one of the first plurality of encoded drive signals comprising a code of the first plurality of codes multiplexed with a non-zero magnitude drive signal using a second logical operation;
receive, based on the first plurality of encoded drive signals, a second plurality of sense signals from the plurality of sense lines; and
determine, based on the assignment of the first plurality of codes to the plurality of drive lines, whether a first touch has occurred on the touch sensor.

2. The system of claim 1, wherein:
applying the first plurality of encoded drive signals to the plurality of drive lines comprises multiplexing the first plurality of drive signals with the first plurality of codes using an XOR function; and
determining whether a first touch has occurred on the touch sensor comprises de-multiplexing the second plurality of sense signals using the first plurality of codes.

3. The system of claim 1, wherein applying encoded signals to one or more lines of a plurality of drive lines of the touch sensor comprises multiplexing the particular code with the zero magnitude drive signal using an XOR function.

4. The system of claim 1, wherein the logic is further configured when executed to:
receive a third plurality of sense signals from the plurality of sense lines;

determine, based on characteristics of the third plurality of sense signals, a second plurality of codes;
assign a code of the second plurality of codes to each of the plurality of drive lines of the touch sensor, at least two of the plurality of drive lines being assigned different codes;
determine, based on the assignment of the second plurality of codes to drive lines, a second plurality of encoded drive signals;
apply the second plurality of encoded drive signals to the plurality of drive lines;
receive, based on the second plurality of encoded drive signals, a fourth plurality of sense signals from the plurality of sense lines; and
determine, based on the assignment of the second plurality of codes to drive signals, a second touch on the touch sensor.

5. The system of claim 1, wherein determining, based on the characteristics of the first plurality of sense signals, the first plurality of codes comprises selecting the first plurality of codes from a superset of codes, the superset of codes being stored in a memory and comprising each of the codes of the first plurality of codes and one or more additional codes.

6. The system of claim 1, wherein determining, based on the characteristics of the first plurality of sense signals, the first plurality of codes comprises generating the first plurality of codes using a sequence generator seeded with a random initial value.

7. The system of claim 1, wherein the logic is further configured when executed to:
determine an amount of noise cancellation associated with each of the first plurality of codes; and
determine a code rotation schedule based on the determined amount of noise cancellation associated with each of the first plurality of codes, wherein the code rotation schedule specifies a schedule for swapping the first plurality of codes among the plurality of drive lines of the touch sensor.

8. A method comprising:
applying encoded signals to one or more lines of a plurality of drive lines of the touch sensor, the encoded signals comprising respective particular codes multiplexed with a zero magnitude drive signal using a first logical operation such that applying the encoded signals comprises applying the respective particular codes to the one or more lines while the drive signal is not applied to the one or more lines;
receiving, based on the encoded signals, a first plurality of sense signals from a plurality of sense lines of a touch sensor, the first plurality of sense signals comprising encoded noise signals;
determining, based on characteristics of the first plurality of sense signals, a first plurality of codes;
assigning a code of the first plurality of codes to each of the plurality of drive lines of the touch sensor, at least two of the plurality of drive lines being assigned different codes;
determining, based on the assignment of the first plurality of codes to drive lines, a first plurality of encoded drive signals;
applying the first plurality of encoded drive signals to the plurality of drive lines, at least one of the first plurality of encoded drive signals comprising a code of the first plurality of codes multiplexed with a non-zero magnitude drive signal using a second logical operation;
receiving, based on the first plurality of encoded drive signals, a second plurality of sense signals from the plurality of sense lines; and
determining, based on the assignment of the first plurality of codes to the plurality of drive lines, that a first touch has occurred on the touch sensor.

9. The method of claim 8, wherein:
applying the first plurality of encoded drive signals to the plurality of drive lines comprises multiplexing the first plurality of drive signals with the first plurality of codes using an XOR function; and
determining that a first touch has occurred on the touch sensor comprises de-multiplexing the second plurality of sense signals using the first plurality of codes.

10. The method of claim 8, wherein applying encoded signals to one or more lines of a plurality of drive lines of the touch sensor comprises multiplexing the particular code with the zero magnitude drive signal using an XOR function.

11. The method of claim 8, further comprising:
receiving a third plurality of sense signals from the plurality of sense lines;
determining, based on characteristics of the third plurality of sense signals, a second plurality of codes;
assigning a code of the second plurality of codes to each of the plurality of drive lines of the touch sensor, at least two of the plurality of drive lines being assigned different codes;
determining, based on the assignment of the second plurality of codes to drive lines, a second plurality of encoded drive signals;
applying the second plurality of encoded drive signals to the plurality of drive lines;
receiving, based on the second plurality of encoded drive signals, a fourth plurality of sense signals from the plurality of sense lines; and
determining, based on the assignment of the second plurality of codes to drive signals, a second touch on the touch sensor.

12. The method of claim 8, wherein determining, based on the characteristics of the first plurality of sense signals, the first plurality of codes comprises selecting the first plurality of codes from a superset of codes, the superset of codes being stored in a memory and comprising each of the codes of the first plurality of codes and one or more additional codes.

13. The method of claim 8, wherein determining, based on the characteristics of the first plurality of sense signals, the first plurality of codes comprises generating the first plurality of codes using a sequence generator seeded with a random initial value.

14. The method of claim 8, further comprising:
determining an amount of noise cancellation associated with each of the first plurality of codes; and
determining a code rotation schedule based on the determined amount of noise cancellation associated with each of the first plurality of codes, wherein the code rotation schedule specifies a schedule for swapping the first plurality of codes among the plurality of drive lines of the touch sensor.

15. A non-transitory computer-readable medium embodying instructions that are configured when executed to:
apply encoded signals to one or more lines of a plurality of drive lines of the touch sensor, the encoded signals comprising respective particular codes multiplexed with a zero magnitude drive signal using a first logical operation such that applying the encoded signals comprises applying the respective particular codes to the one or more lines while the drive signal is not applied to the one or more lines;

receive, based on the encoded signals, a first plurality of sense signals from a plurality of sense lines of the touch sensor, the first plurality of sense signals comprising encoded noise signals;

determine, based on characteristics of the first plurality of sense signals, a first plurality of codes;

assign a code of the first plurality of codes to each of the plurality of drive lines of the touch sensor, at least two of the plurality of drive lines being assigned different codes;

determine, based on the assignment of the first plurality of codes to drive lines, a first plurality of encoded drive signals;

apply the first plurality of encoded drive signals to the plurality of drive lines, at least one of the first plurality of encoded drive signals comprising a code of the first plurality of codes multiplexed with a non-zero magnitude drive signal using a second logical operation;

receive, based on the first plurality of encoded drive signals, a second plurality of sense signals from the plurality of sense lines; and determine, based on the assignment of the first plurality of codes to the plurality of drive lines, whether a first touch has occurred on the touch sensor.

16. The non-transitory computer-readable medium of claim 15, wherein:

applying the first plurality of encoded drive signals to the plurality of drive lines comprises multiplexing the first plurality of drive signals with the first plurality of codes using an XOR function; and determining whether a first touch has occurred on the touch sensor comprises de-multiplexing the second plurality of sense signals using the first plurality of codes.

17. The non-transitory computer-readable medium of claim 15, wherein applying encoded signals to one or more lines of a plurality of drive lines of the touch sensor comprises multiplexing the particular code with the zero magnitude drive signal using an XOR function.

18. The non-transitory computer-readable medium of claim 15, wherein the instructions are further configured when executed to:

receive a third plurality of sense signals from the plurality of sense lines;

determine, based on characteristics of the third plurality of sense signals, a second plurality of codes;

assign a code of the second plurality of codes to each of the plurality of drive lines of the touch sensor, at least two of the plurality of drive lines being assigned different codes;

determine, based on the assignment of the second plurality of codes to drive lines, a second plurality of encoded drive signals;

apply the second plurality of encoded drive signals to the plurality of drive lines;

receive, based on the second plurality of encoded drive signals, a fourth plurality of sense signals from the plurality of sense lines; and determine, based on the assignment of the second plurality of codes to drive signals, a second touch on the touch sensor.

19. The non-transitory computer-readable medium of claim 15, wherein determining, based on the characteristics of the first plurality of sense signals, the first plurality of codes comprises selecting the first plurality of codes from a superset of codes, the superset of codes being stored in a memory and comprising each of the codes of the first plurality of codes and one or more additional codes.

20. The non-transitory computer-readable medium of claim 15, wherein determining, based on the characteristics of the first plurality of sense signals, the first plurality of codes comprises generating the first plurality of codes using a sequence generator seeded with a random initial value.

21. The non-transitory computer-readable medium of claim 15, wherein the instructions are further configured when executed to:

determine an amount of noise cancellation associated with each of the first plurality of codes; and determine a code rotation schedule based on the determined amount of noise cancellation associated with each of the first plurality of codes, wherein the code rotation schedule specifies a schedule for swapping the first plurality of codes among the plurality of drive lines of the touch sensor.

* * * * *